(12) United States Patent
Morioka (10) Patent No.: US 7,173,400 B2
(45) Date of Patent: Feb. 6, 2007

(54) POWER SUPPLY DEVICE

(75) Inventor: Shizuo Morioka, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 123 days.

(21) Appl. No.: 10/978,334

(22) Filed: Nov. 2, 2004

(65) Prior Publication Data

US 2005/0116695 A1 Jun. 2, 2005

(30) Foreign Application Priority Data

Nov. 28, 2003 (JP) ............................. 2003-400797

(51) Int. Cl.
*G05F 1/563* (2006.01)

(52) U.S. Cl. ...................... 323/266; 323/272

(58) Field of Classification Search ........ 323/222–225, 323/266, 268, 272, 282, 284, 285, 351
See application file for complete search history.

(56) References Cited

U.S. PATENT DOCUMENTS

| | | | |
|---|---|---|---|
| 4,195,333 A | 3/1980 | Hedel | |
| 6,362,986 B1 * | 3/2002 | Schultz et al. | 363/132 |
| 6,713,992 B2 * | 3/2004 | Matsuo et al. | 323/266 |
| 6,771,052 B2 * | 8/2004 | Ostojic | 323/266 |
| 6,784,644 B2 * | 8/2004 | Xu et al. | 323/225 |
| 6,975,098 B2 * | 12/2005 | Vinciarelli | 323/266 |

FOREIGN PATENT DOCUMENTS

| | | |
|---|---|---|
| EP | 0550167 A | 7/1993 |
| JP | 2002-44941 | 2/2002 |

OTHER PUBLICATIONS

Seiya Abe et al., "Fast Transient Response of Two-stage DC—DC Converter with Low-Voltage/High-current Output," IEEE International Symposium On Industrial Electronics, Jun. 9, 2003, pp. 417-421.

Julian Y. Zhu et al., "Control Loop Design for Two-stage Dc—Dc Converters with Low Voltage/High Current Output," IEEE Annual Applied Power Electronics Conference, Feb. 2003, pp. 859-865.

* cited by examiner

*Primary Examiner*—Gary L Laxton
(74) *Attorney, Agent, or Firm*—Finnegan, Henderson, Farabow, Garrett & Dunner, L.L.P.

(57) ABSTRACT

A power supplying power supply circuit which supplies power to an N-phase PWM control DC/DC converter power supply circuit multiplies the output voltage thereof by 1/N by use of a voltage divider and outputs the result of multiplication to the inverting input terminal of an error amplifier. Further, the power supplying power supply circuit inputs the output voltage of the N-phase PWM control DC/DC converter power supply circuit to the non-inverting input terminal via a switching circuit. An output of the error amplifier is supplied to a transistor so as to control and set the voltage value of output power of the power supplying power supply circuit equal to N×output voltage of the N-phase PWM control DC/DC converter power supply circuit.

7 Claims, 10 Drawing Sheets

POWER SUPPLY DEVICE

CROSS-REFERENCE TO RELATED APPLICATIONS

This application is based upon and claims the benefit of priority from prior Japanese Patent Application No. 2003-400797, filed Nov. 28, 2003, the entire contents of which are incorporated herein by reference.

BACKGROUND OF THE INVENTION

1. Field of the Invention

This invention relates to a ripple reduction technique for reducing a ripple of an output of a multiphase power supply device which supplies power of low voltage and large current to a high-performance processor, for example.

2. Description of the Related Art

In recent years, various types of personal computers such as notebook-type personal computers and desktop-type personal computers are developed, sold and widely popularized. Further, the performance of the processor mounted on the personal computer is markedly enhanced and power supplied to the processor tends to have a lower voltage of 1 volt (V) and a larger current of 100 amperes (A), for example, as the performance is more enhanced.

In order to supply such power, recently, a so-called multiphase PWM (Pulse Width Modulation) control DC/DC converter power supply device having a plurality of PWM switching DC/DC converters connected in parallel is often used (refer to U.S. Pat. No. 4,195,333, for example). The PWM switching DC/DC converter is a DC/DC converter having a function of controlling the output power amount by changing the output (ON)/interruption (OFF) period in each cycle. The multiphase PWM control DC/DC converter power supply device generates power of desired low voltage and large current by controlling the switching operation of each PWM switching DC/DC converter.

The output current of the multiphase PWM control DC/DC converter power supply device which is generated by use of a plurality of PWM switching DC/DC converters generally becomes a ripple current containing a variation. Conventionally, it is possible to select the number of phases of the multiphase PWM control DC/DC converter power supply device and supply voltage to the multiphase PWM control DC/DC converter power supply device so as to suppress the variation in the ripple current to minimum. However, the output ripple current is greatly changed according to a variation in the supply voltage and a change in the output voltage (the supply voltage must be changed in some cases according to the consumption current in the recent processor). Therefore, the ripple voltage becomes high and there occurs a problem (associated with the cost and space) that the electrostatic capacitance of a so-called smoothing capacitor must be made large by taking the above case into consideration. Further, there occurs a problem of the performance that a power loss occurs when a large ripple current flows into the capacitor and the efficiency is lowered.

Further, the multiphase PWM control DC/DC converter power supply device is required to change the output voltage depending on a difference in a load to be connected. Also, at this time, the same problem as described above occurs, and if the output voltage must be changed to a greater extent, there occurs a problem that the above capacitor must be replaced by a capacitor with larger capacitance.

BRIEF SUMMARY OF THE INVENTION

According to an embodiment of the present invention, a power supply device comprises a power supply unit including N DC/DC converters connected in parallel; a detecting unit configured to detect a voltage value of power output from the power supply unit; a power supply unit configured to supply power to the power supply unit; and a control unit configured to control a voltage value of power output from the power supply unit to a voltage value which is N times a voltage value detected by the detecting unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

There will now be described embodiments of this invention with reference to the accompanying drawings.

First Embodiment

Figure 1:
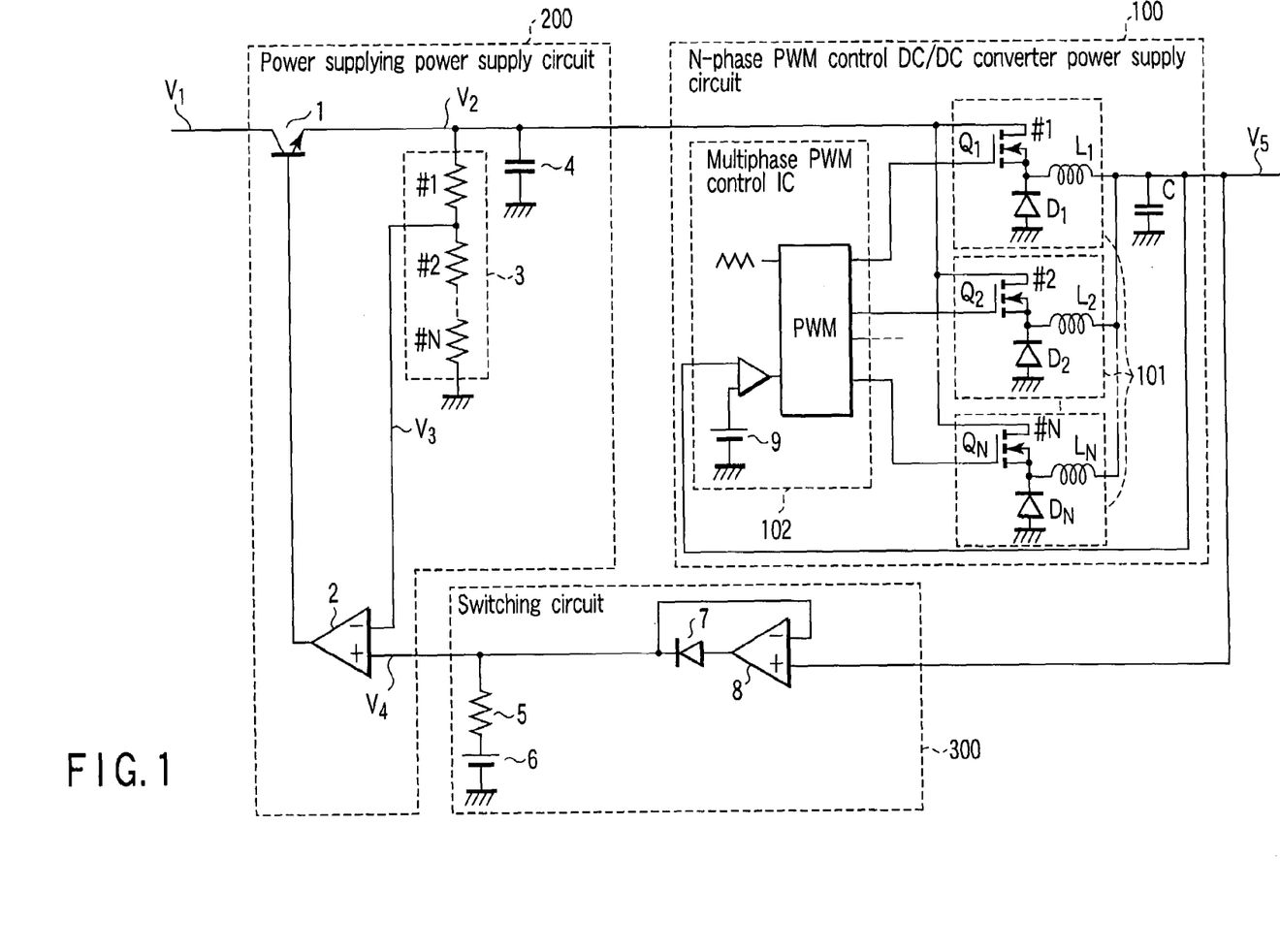
FIG. 1 is a diagram showing the configuration of a power supply device according to a first embodiment of this invention.

First, a first embodiment of this invention is explained. FIG. 1 is a diagram showing the configuration of a power supply device according to the first embodiment. The power supply device supplies power to a processor or the like of a personal computer, for example. As shown in FIG. 1, the power supply device includes an N-phase PWM control DC/DC converter power supply circuit (multiphase PWM control DC/DC converter power supply unit) 100, power supplying power supply circuit (power supply unit) 200 and switching circuit (switching unit) 300.

The N-phase PWM control DC/DC converter power supply circuit 100 has N PWM switching DC/DC converters 101 connected in parallel. It generates and outputs power V5 of low voltage and large current which is required according to a load (not shown) by synchronizing the switching operations of the converters to provide preset phase differences. The power supplying power supply circuit 200 is supplied with power V1 from a power supply (not shown) and operated in cooperation with the switching circuit 300 to generate and output power V2 of a voltage value which suppresses the ripple current to minimum when the N-phase PWM control DC/DC converter power supply circuit 100 generates and outputs power V5. In this case, the general principle for reducing the ripple current is explained with reference to FIG. 2 to FIGS. 4A, 4B.

Figure 2:
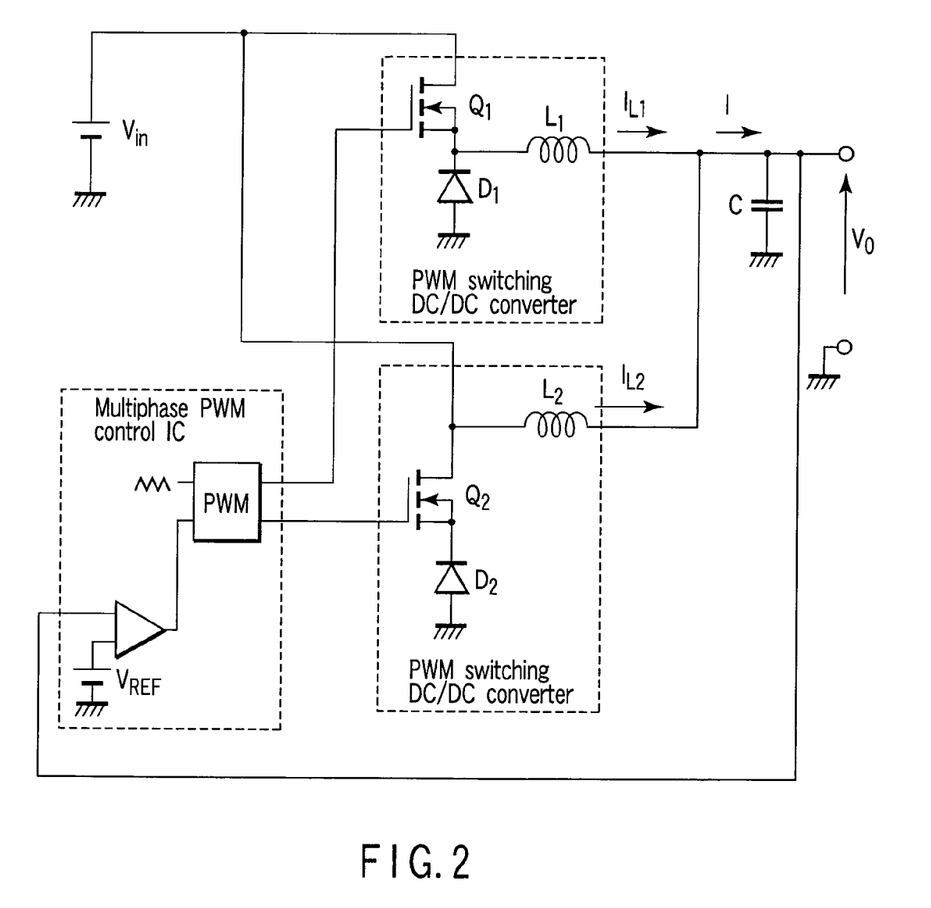
FIG. 2 is a first diagram for illustrating a general principle for suppressing a ripple current of a multiphase PWM control DC/DC converter power supply circuit.
Figure 3:
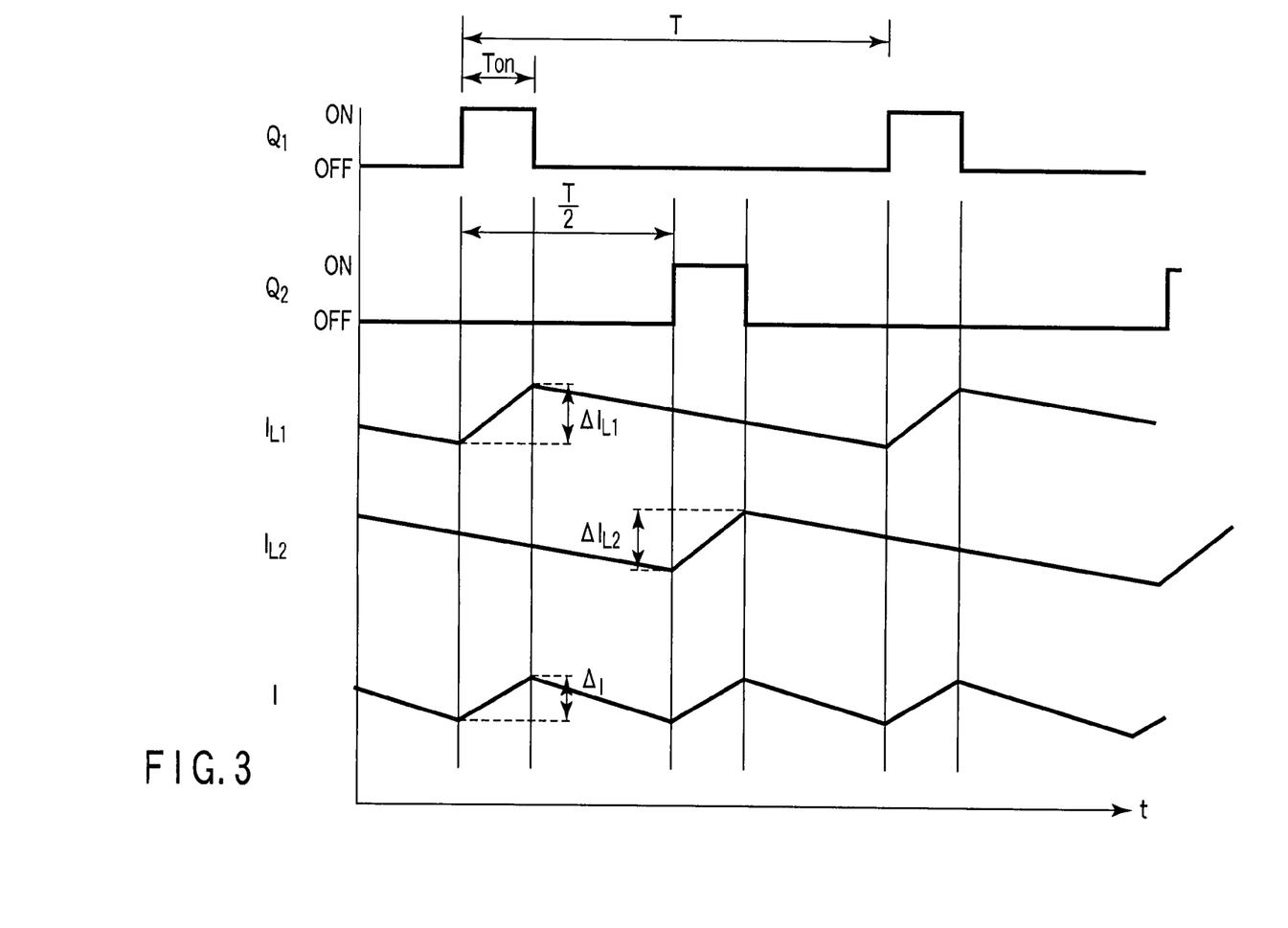
FIG. 3 is a second diagram for illustrating a general principle for suppressing a ripple current of a multiphase PWM control DC/DC converter power supply circuit.

It is assumed that elements which configure a 2-phase PWM control DC/DC converter power supply circuit shown in FIG. 2 are ideal elements. The ideal element is an element having no loss and indicates that the ON resistance is zero in the case of transistors Q1, Q2, the resistance component is zero in the case of inductors L1, L2 and the forward voltage is zero in the case of diodes D1, D2, for example. In this case, the ON-duty of the switching transistor is determined by the magnitudes of input and output voltages (ON-duty Ton=Vo/Vin). FIG. 3 is a diagram showing the current waveforms and the like at the time of operation of the 2-phase PWM control DC/DC converter power supply circuit.

As shown in FIG. 3, in the 2-phase PWM control DC/DC converter power supply circuit, a current IL1 is output by turning ON the transistor Q1 of one of the converters for a certain period of time in the front half of each cycle T and a current IL2 is output by turning ON the transistor Q2 of the other converter for the same period of time in the latter half. The currents IL1, IL2 which are deviated from each other by the T/2 cycle contain ripple components of $\Delta IL1$, $\Delta IL2$ ($\Delta IL1$, $\Delta IL2$ are set at the same value). An output current of the 2-phase PWM control DC/DC converter power supply circuit obtained by adding the above currents together finally becomes a current I which contains a ripple component of $\Delta I$.

Figure 4A:
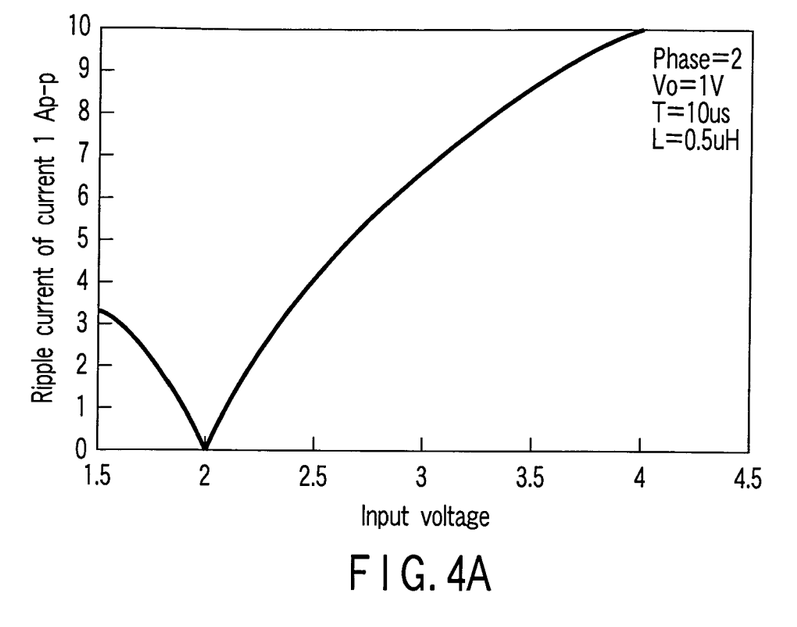
FIGS. 4A, 4B are third diagrams for illustrating a general principle for suppressing a ripple current of a multiphase PWM control DC/DC converter power supply circuit.
Figure 4B:
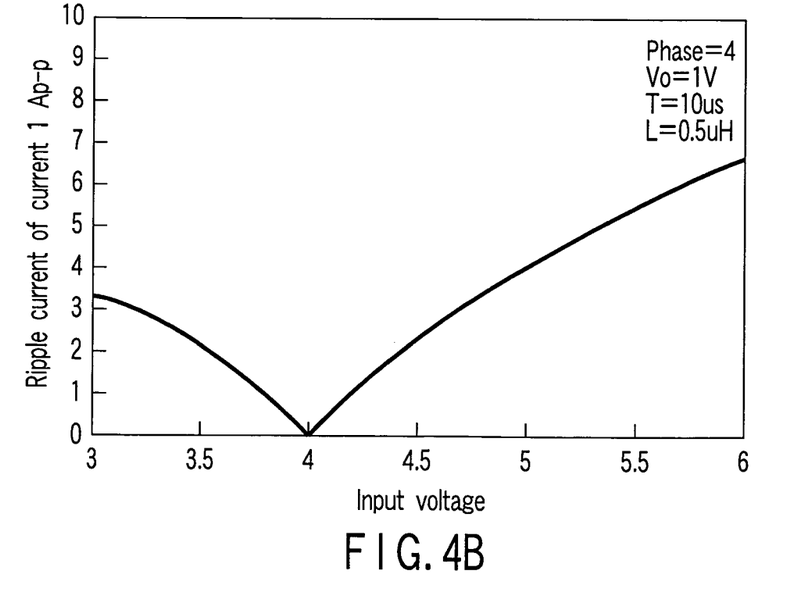

FIGS. 4A, 4B each show a variation in the ripple component of the current I in a case wherein the input voltage is changed when the inductances of the inductors L1, L2 are set at the same value, the switching cycle is 10 μs, L1=L2=0.5 μH and Vo=1 V. As shown in FIG. 4A, it is understood that the ripple component of the current I becomes zero when the input voltage is set to 2 V, that is, when the ratio of the input voltage Vin to the output voltage Vo is set to 2:1. Further, in this case, the transistor Q1 of one of the converters is kept ON in the front half period of each cycle shown in FIG. 3 and the transistor Q2 of the other converter is kept ON in the latter half period. FIG. 4B shows a case of a 4-phase PWM control DC/DC converter power supply circuit. As shown in FIG. 4B, it is understood that the ripple component of the current I becomes zero when the input voltage is set to 4 V, that is, when the ratio of the input voltage Vin to the output voltage Vo is set to 4:1.

In the power supply device of the first embodiment, the power supplying power supply circuit 200 and switching circuit 300 are cooperatively operated to generate and output power V2 of a voltage value obtained by N×(voltage value) of power V5 which is generated and output from the N-phase PWM control DC/DC converter power supply circuit 100. This is explained in detail below.

As described before, power V1 is supplied from a power supply (not shown) to the power supplying power supply circuit 200. As shown in FIG. 1, the power supplying power supply circuit 200 includes a transistor 1, error amplifier 2, voltage divider 3 and smoothing capacitor 4. Voltage (V3) obtained by multiplying voltage of the power V2 output from the power supplying power supply circuit 200 by 1/N by use of the voltage divider 3 is supplied to an inverting input terminal of the error amplifier 2. Further, voltage (V4) from the switching circuit 300 is supplied to the non-inverting input terminal. As shown in FIG. 1, in the switching circuit 300, a resistor 5, voltage source 6, diode 7 and amplifier 8 are provided. Thus, in a non-operative state of the N-phase PWM control DC/DC converter power supply circuit 100, voltage from the voltage source 6 is supplied to the non-inverting input terminal of the error amplifier 2. The resistor 5 is provided to prevent V5 from being clamped at the voltage value from the voltage source 6.

An output of the error amplifier 2 is supplied to the transistor 1 and the output value rises until voltage of the non-inverting input terminal becomes equal to voltage of the non-inverting input terminal. Therefore, the voltage value of the output power V2 of the power supplying power supply circuit 200 when the voltage of the non-inverting input terminal becomes equal to the voltage of the non-inverting input terminal is obtained by V4×N=(voltage of the voltage source 6)×N.

The N-phase PWM control DC/DC converter power supply circuit 100 starts the operation in response to the output power V2 from the power supplying power supply circuit 200 and the voltage value of the output power V5 tends to become equal to voltage of a reference voltage source 9 under the control of a multiphase PWM control IC 102. In this process, the voltage value of the output power V2 of the power supplying power supply circuit 200 is changed to N times the voltage value of the output power V5 of the N-phase PWM control DC/DC converter power supply circuit 100.

That is, first, the amplifier 8 tends to lower the voltage on the inverting input terminal side in the state of "voltage value of V5<voltage value of voltage source 6". However, it cannot lower the voltage due to the presence of the diode 7 and voltage of the voltage source 6 is supplied to the non-inverting input terminal of the error amplifier 2 as it is. Therefore, the voltage value of the output power V2 of the power supplying power supply circuit 200 is set equal to "(voltage of the voltage source 6)×N" in the state of "voltage value of V5<voltage value of voltage source 6".

Next, the output power V5 of the N-phase PWM control DC/DC converter power supply circuit 100 rises towards the voltage of the reference voltage source 9 with time. When the state of "voltage value of V5<voltage value of voltage source 6" is set up, voltage equivalent to the voltage of V5 is supplied to the non-inverting input terminal of the error amplifier 2 by the operation of the amplifier 8. As a result, the voltage value of the output power V2 of the power supplying power supply circuit 200 becomes equal to "(voltage value of V5)×N".

When the consumption current in the load connected to the output side of the N-phase PWM control DC/DC converter power supply circuit 100 varies, for example, and the output voltage of the N-phase PWM control DC/DC converter power supply circuit 100 varies for some reason, the voltage value of the output power V2 of the power supplying power supply circuit 200 varies to follow the variation. Thus, the output voltage is kept at "(voltage value of V5)×N" and the condition that the ripple current of the N-phase PWM control DC/DC converter power supply circuit 100 is suppressed to minimum can be kept maintained.

As described above, in the present power supply device, the voltage value of the power supplied to the N-phase PWM control DC/DC converter power supply circuit 100 is controlled to be set approximately equal to the "number of phases" times the voltage value of the output power of the N-phase PWM control DC/DC converter power supply circuit 100. Therefore, the high performance of small ripple current and low ripple voltage can be attained, and as a result, the low cost and space saving can be realized.

Second Embodiment

Figure 5:
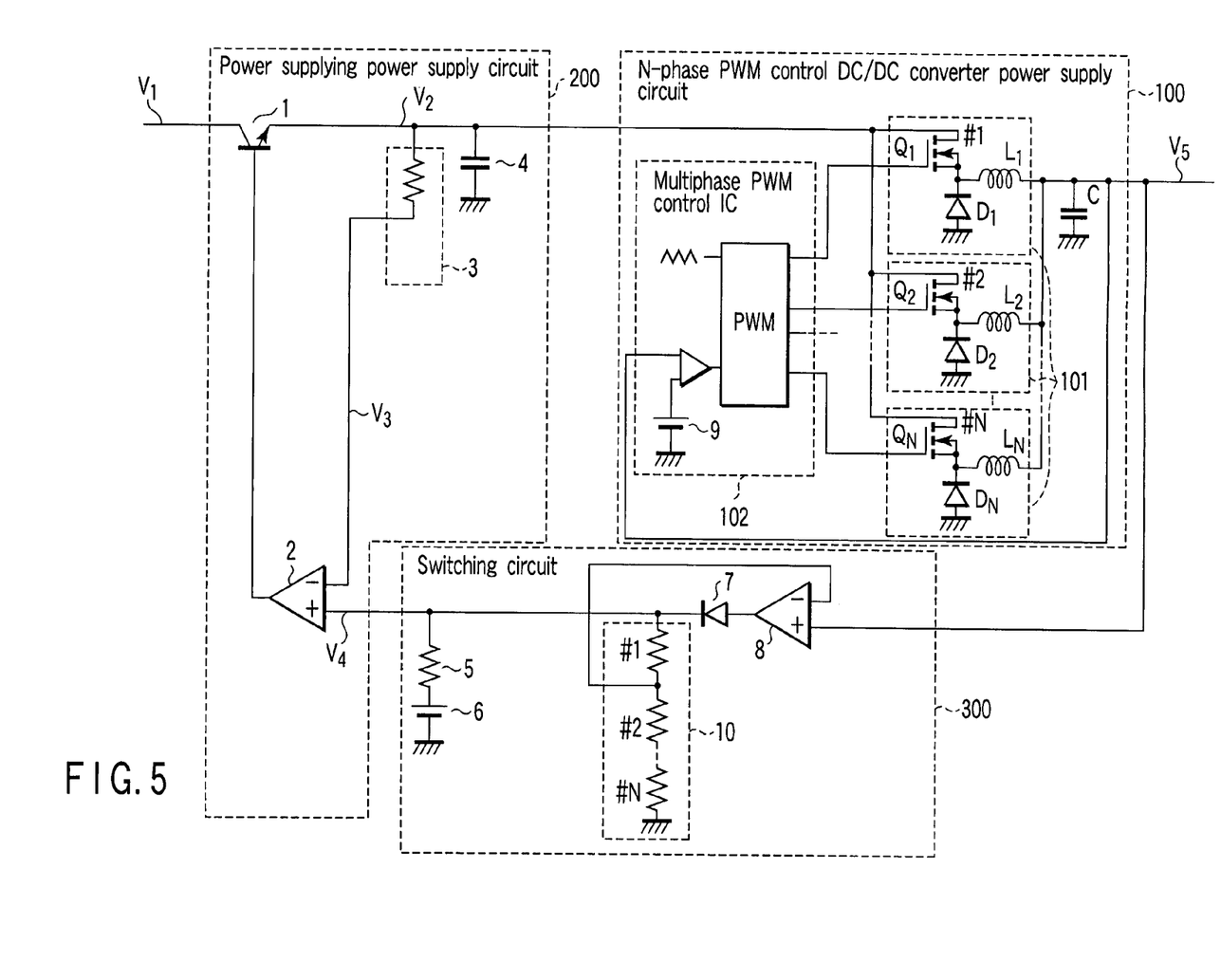
FIG. 5 is a diagram showing the configuration of a power supply device according to a second embodiment of this invention.

Next, a second embodiment of this invention is explained. FIG. 5 is a diagram showing the configuration of a power supply device according to the second embodiment.

The power supply device of the second embodiment is different from the power supply device of the first embodiment in that the voltage dividing ratio of the voltage divider 3 is changed from 1/N to 1 in the power supply device of the second embodiment as shown in FIG. 5. Instead, the gain of the amplifier 8 is multiplied by N by use of a newly provided voltage divider 10 and voltage of the voltage source 6 is multiplied by N.

Also, in the power supply device of the second embodiment, the voltage value of the output power V2 of the power supplying power supply circuit. 200 is set equal to "(voltage value of V5)×N". Thus, the condition that the ripple current of the N-phase PWM control DC/DC converter power supply circuit 100 is suppressed to minimum can be kept maintained.

Third Embodiment

Figure 6:
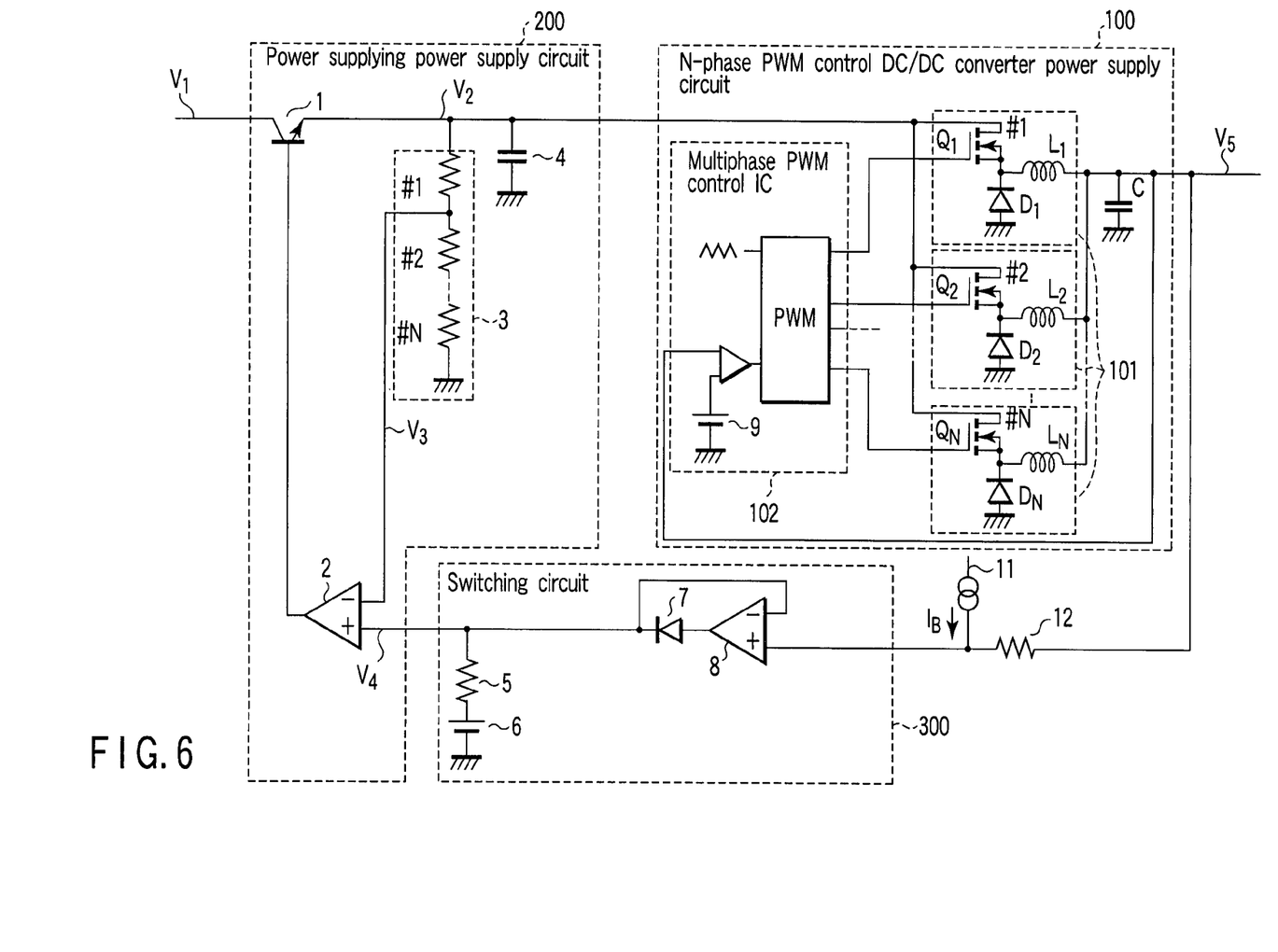
FIG. 6 is a diagram showing the configuration of a power supply device according to a third embodiment of this invention.

Next, a third embodiment of this invention is explained. FIG. 6 is a diagram showing the configuration of a power supply device according to the third embodiment.

The power supply device of the third embodiment is obtained by additionally providing a constant current source 11 and resistor 12 in the power supply device of the first embodiment as shown in FIG. 6.

In the power supply device of the third embodiment, voltage of "V5+IB×resistance of resistor 12" is supplied to the non-inverting input terminal of an amplifier 8. That is, the voltage value of output power V2 of a power supplying power supply circuit 200 is set equal to "(V5+IB×resistance of resistor 12)×N". Thus, the voltage value of the output power V2 can be increased or decreased by a preset amount of "(IB×resistance of resistor 12)×N" (it is increased or decreased when the polarity of IB is "+" or "−", respectively).

Therefore, it becomes possible to compensate for a deviation in an input voltage ratio which causes an output current of an N-phase PWM control DC/DC converter power supply circuit 100 to be set to zero owing to losses occurring in transistors Q1 to QN, inductors L1 to LN, diodes D1 to DN and the like of the respective N PWM switching DC/DC converters 101 connected in parallel in the N-phase PWM control DC/DC converter power supply circuit 100. Thus, the condition that the ripple current of the N-phase PWM control DC/DC converter power supply circuit 100 is suppressed to minimum can be kept maintained.

Figure 7:
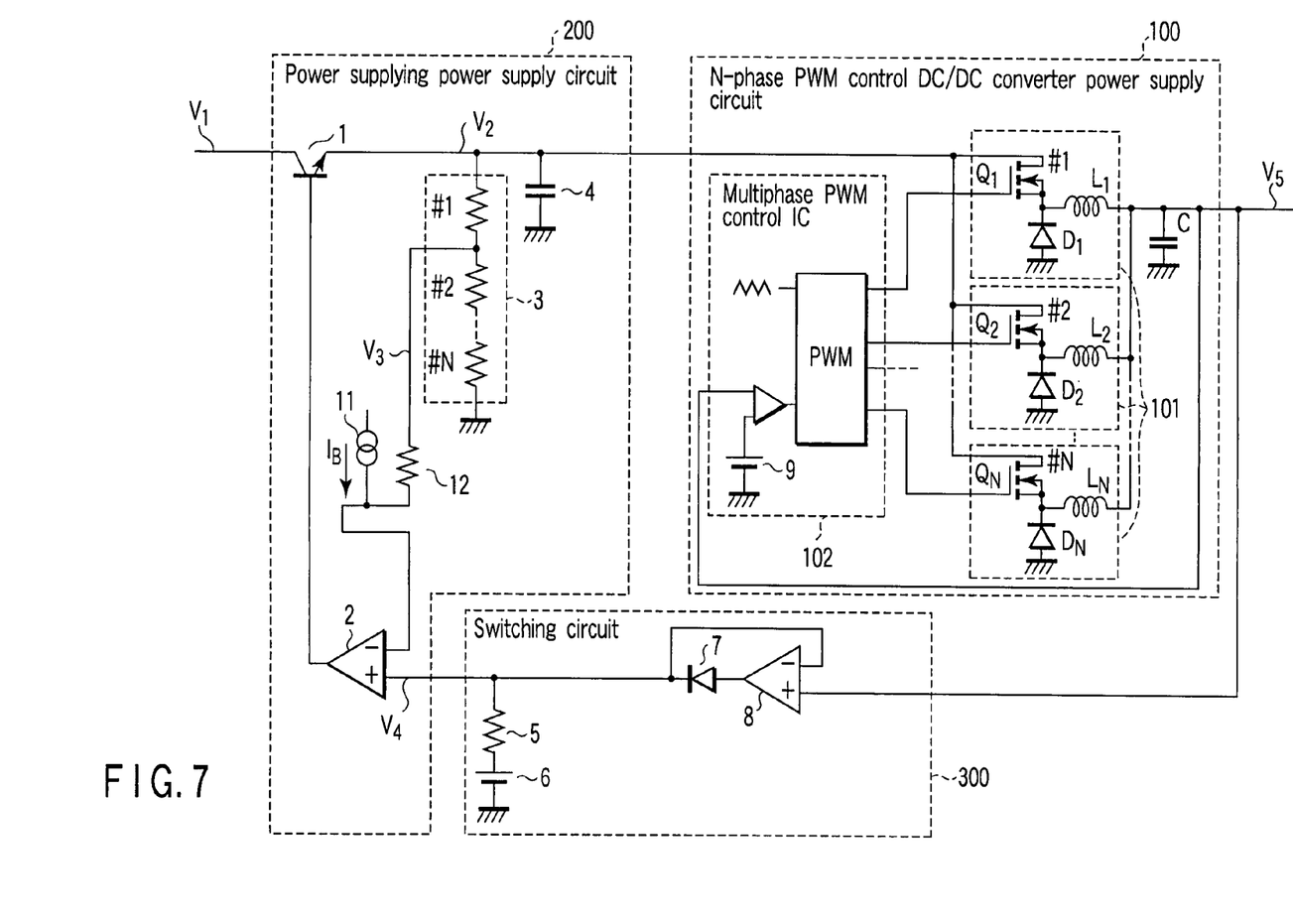
FIG. 7 is a diagram showing a first modification of the power supply device of the third embodiment.
Figure 8:
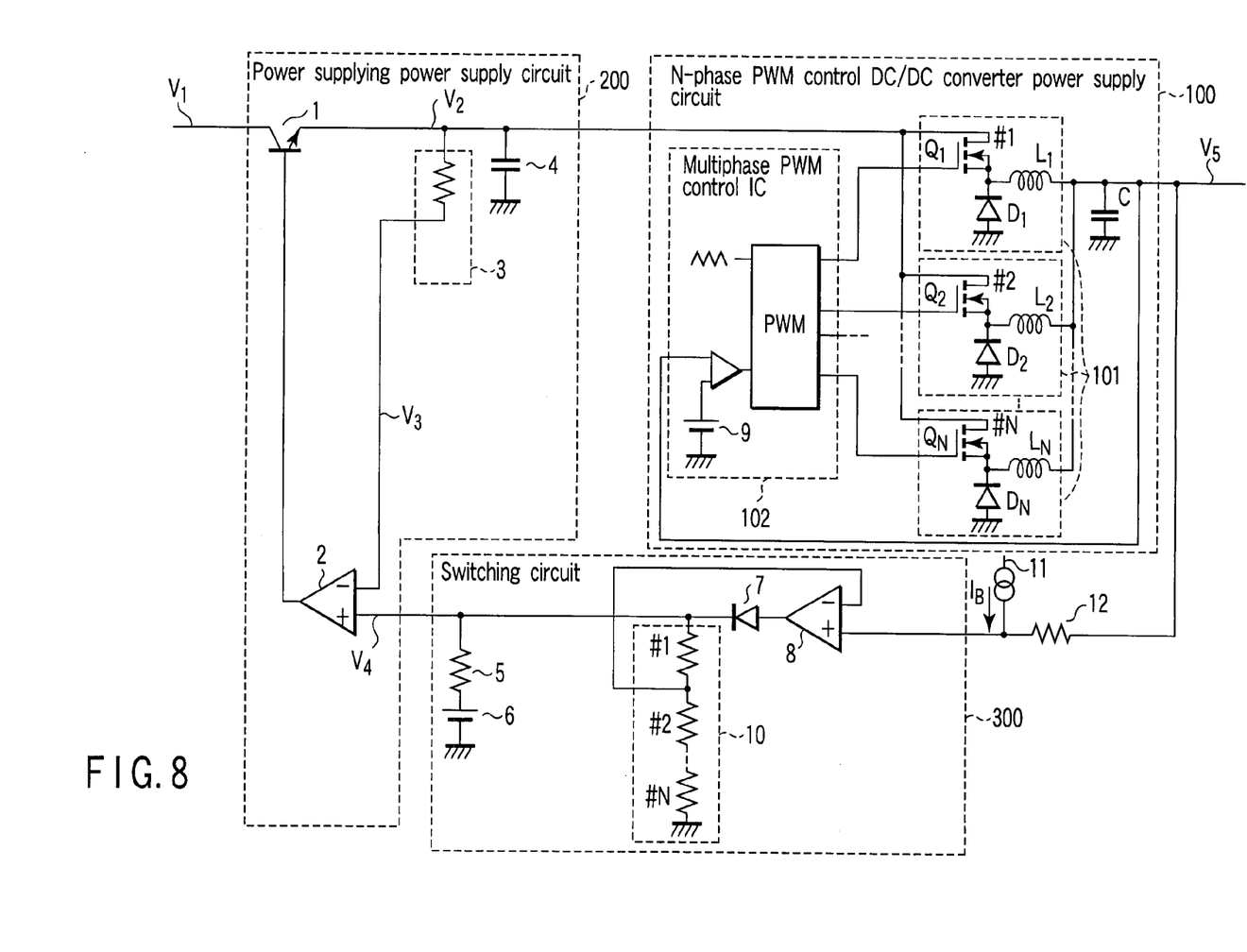
FIG. 8 is a diagram showing a second modification of the power supply device of the third embodiment.
Figure 9:
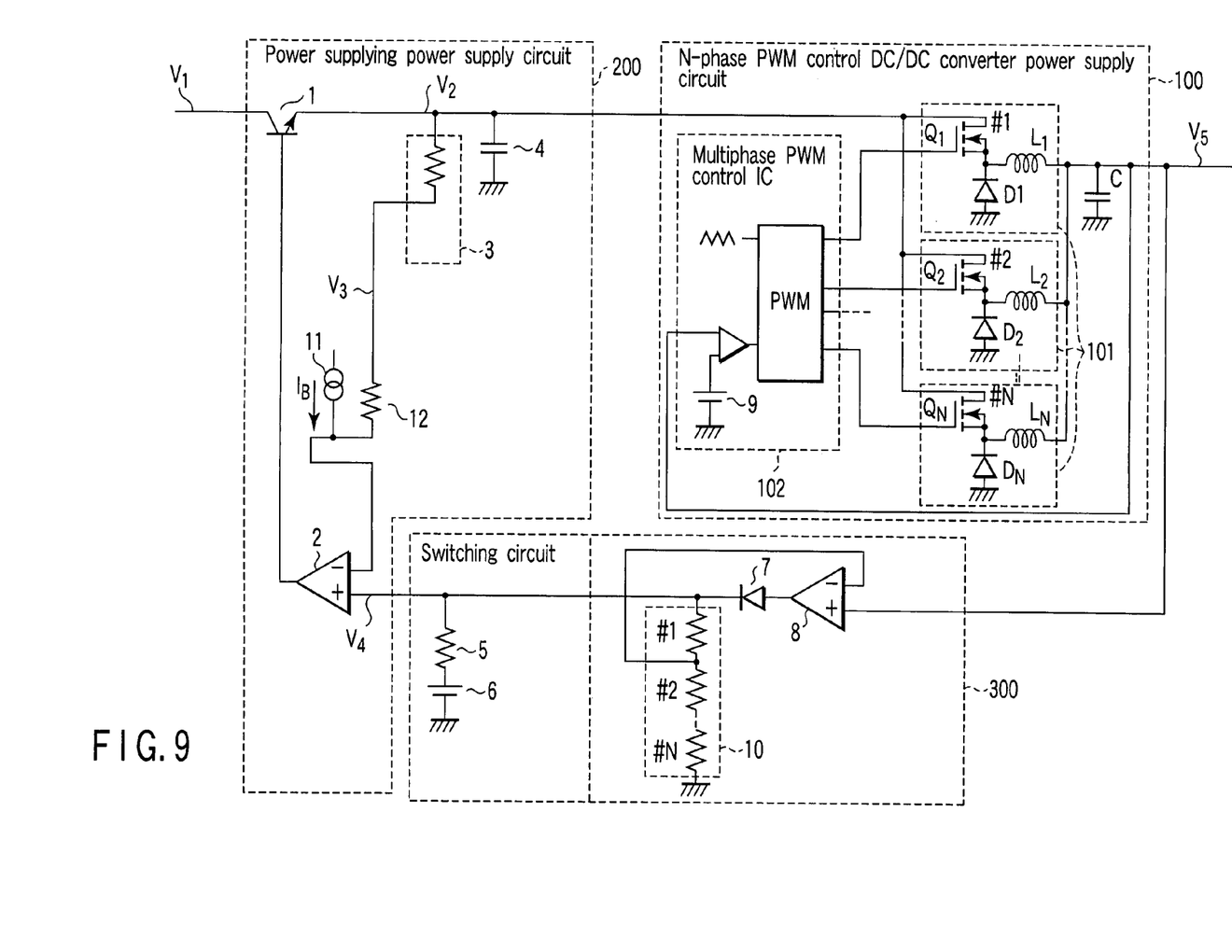
FIG. 9 is a diagram showing a third modification of the power supply device of the third embodiment.

The arrangement position of the constant current source 11 and resistor 12 is not limited to the above case. For example, even if the arrangement position is changed as shown in FIG. 7, the same effect can be attained. That is, a deviation in an input voltage ratio due to the losses occurring in the transistors Q1 to QN, inductors L1 to LN, diodes D1 to DN and the like of the respective N PWM switching DC/DC converters 101 can be compensated for. Further, it is also effective to arrange the constant current source 11 and resistor 12 in the power supply device of the second embodiment as shown in FIGS. 8 and 9.

Fourth Embodiment

Figure 10:
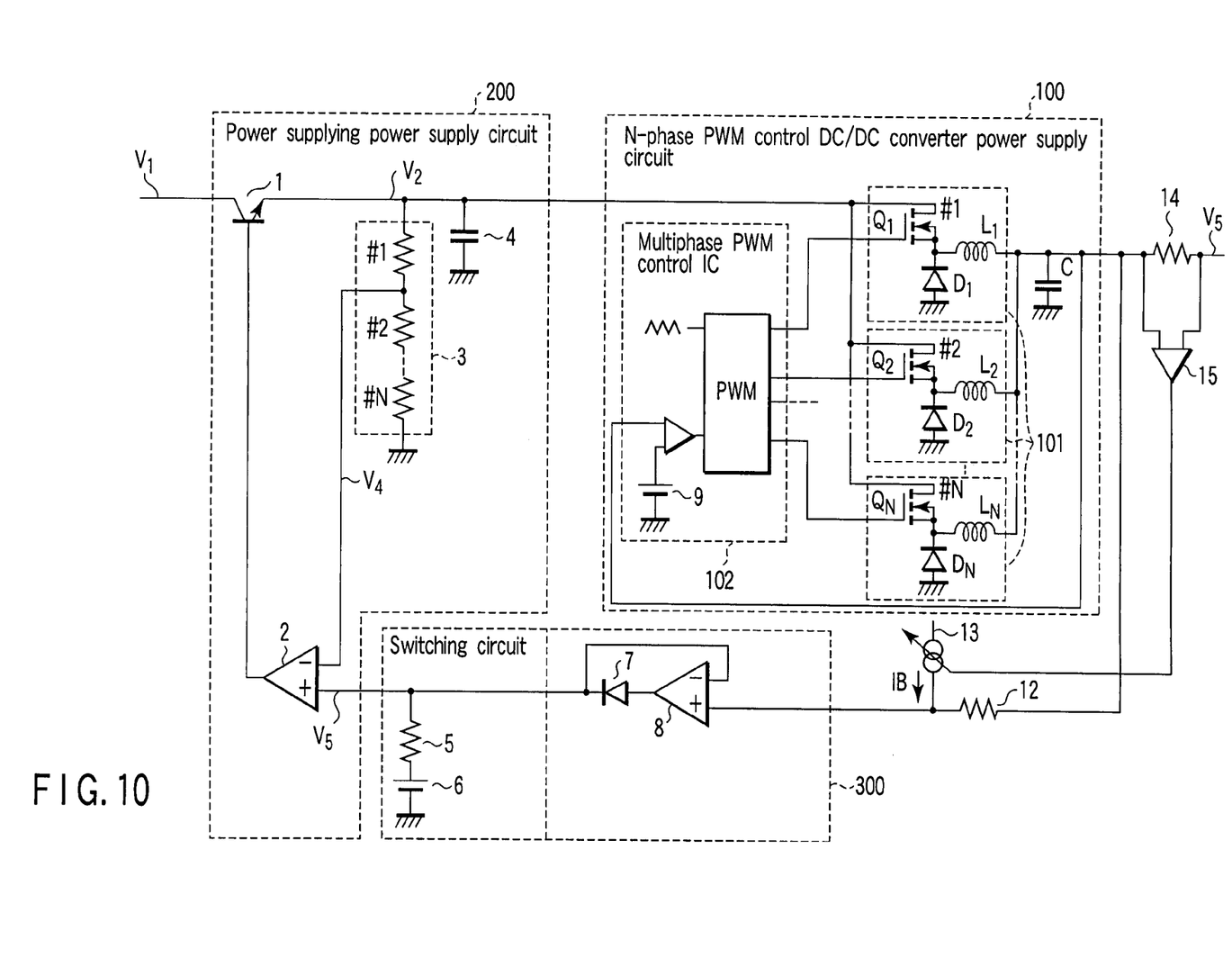
FIG. 10 is a diagram showing the configuration of a power supply device according to a fourth embodiment of this invention.

Next, a fourth embodiment of this invention is explained. FIG. 10 is a diagram showing the configuration of a power supply device according to the fourth embodiment.

As shown in FIG. 10, the power supply device of the fourth embodiment additionally includes a resistor 14 and amplifier 15 in the power supply device of the third embodiment described before. The resistor 14 detects a current value of output power V5 of an N-phase PWM control DC/DC converter power supply circuit 100 and the amplifier 15 detects a difference in voltage across the resistor 14. Further, the constant current source 11 is replaced by a constant current source 13 of a type whose output current varies according to an output of the amplifier 15.

That is, the current value of the output power V5 of the N-phase PWM control DC/DC converter power supply circuit 100 is detected by use of the resistor 14 and amplifier 15 and the magnitude IB of an output current of the constant current source 13 is determined based on the result of detection. Voltage of "V5+IB×resistance of resistor 12" is supplied to the non-inverting input terminal of the amplifier 8. As a result, a voltage value of output power V2 of a power supplying power supply circuit 200 is set to "(V5+IB× resistance of resistor 12)×N". Thus, the voltage value of the output power V2 can be increased or decreased by a preset amount of "(IB×resistance of resistor 12)×N" which varies depending on the magnitude of the output current of the N-phase PWM control DC/DC converter power supply circuit 100 (it is increased or decreased when the polarity of IB is "+" or "−", respectively).

Therefore, it becomes possible to compensate for a deviation in an input voltage ratio which causes the output current of the N-phase PWM control DC/DC converter power supply circuit 100 to be set to zero owing to the losses occurring in transistors Q1 to QN, inductors L1 to LN, diodes D1 to DN and the like of respective N PWM switching DC/DC converters 101 caused by a variation in the output current of the N-phase PWM control DC/DC converter power supply circuit 100. Thus, the condition that the ripple current of the N-phase PWM control DC/DC converter power supply circuit 100 is suppressed to minimum can be kept maintained.

The method in the fourth embodiment can be applied not only to the power supply device with the configuration of FIG. 6 explained here but also to the power supply device with the configuration shown in one of FIGS. 7 to 9.

Further, in this example, a case wherein the magnitude of the output current of the constant current source 13 is changed according to the magnitude of the output current of the N-phase PWM control DC/DC converter power supply circuit 100 is explained. However, instead of this, it is possible to detect currents flowing through the transistors Q1 to QN, currents flowing through the inductors L1 to LN, currents flowing through the diodes D1 to DN or an input current of the N-phase PWM control DC/DC converter power supply circuit 100, for example. The same effect can be attained by controlling the output current of the constant current source 13 based on the result of detection. That is, the output current of the constant current source 13 may be controlled based on a current value or voltage value which has a preset relation with respect to the output current of the N-phase PWM control DC/DC converter power supply circuit 100.

Further, in the N-phase PWM control DC/DC converter power supply circuit 100 of each of the first to fourth embodiments, the diodes D1 to DN are used in each of the N PWM switching DC/DC converters 101 for flywheel. However, the diodes can be replaced by active switching elements such as FETs, that is, synchronous commutators.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply device comprising:
   a multi-phase PWM control DC/DC converter power supply unit including N number of DC/DC converters connected in parallel;
   a detecting unit configured to detect a voltage value of power output from the multi-phase PWM control DC/DC converter power supply unit;
   a power supplying power supply unit configured to supply power to the multi-phase PWM control DC/DC converter power supply unit; and
   a control unit configured to control a voltage value of power output from the power supplying power supply unit to a voltage value which is N times the voltage value detected by the detecting unit.

2. A power supply device comprising:
   a multi-phase PWM control DC/DC converter power supply unit having N number of DC/DC converters connected in parallel;
   a power supplying power supply unit configured to supply power to the multi-phase PWM control DC/DC converter power supply unit; and a switching unit configured to select a reference voltage which is used by the power supplying power supply unit to control a voltage value of power output to the multi-phase PWM control DC/DC converter power supply unit,
   wherein the power supplying power supply unit includes:
   a transistor which controls the voltage value of the power output to the multi-phase PWM control DC/DC converter power supply unit;
   a voltage divider which acquires a voltage equal to 1/N times the voltage value of the power output to the multi-phase PWM control DC/DC converter power supply unit; and
   an error amplifier which has a first terminal supplied with the voltage acquired by the voltage divider and a second terminal supplied with the reference voltage selected by the switching unit, and supplies a control signal generated from a voltage supplied via the first terminal and a voltage supplied via the second terminal to the transistor, and
   the switching unit includes:
   an acquiring unit configured to acquire a voltage of power output from the multi-phase PWM control DC/DC converter power supply unit;
   a voltage source configured to output power of a preset voltage value; and
   a control unit configured to supply the voltage of power acquired by the acquiring unit to the second terminal of the error amplifier as the reference voltage when the voltage value of power acquired by the acquiring unit is not smaller than the preset voltage value of power output from the voltage source, and to supply the preset voltage of power output from the voltage source to the second terminal of the error amplifier as the reference voltage when the voltage value of power acquired by the acquiring unit is smaller than the preset voltage value of power output from the voltage source.

3. The power supply device according to claim 2, further comprising an adjusting unit which increases/decreases the voltage of power acquired by the acquiring unit of the switching unit by a preset amount.

4. The power supply device according to claim 2, wherein the power supplying power supply unit further includes an adjusting unit which increases/decreases the voltage of power to be supplied to the first terminal of the error amplifier by a preset amount.

5. A power supply device comprising:
   a multi-phase PWM control DC/DC converter power supply unit having N number of DC/DC converters connected in parallel;
   a power supplying power supply unit configured to supply power to the multi-phase PWM control DC/DC converter power supply unit; and
   a switching unit configured to select a reference voltage used by the power supplying power supply unit to control a voltage value of power output to the multi-phase PWM control DC/DC converter power supply unit,
   wherein the power supplying power supply unit includes:
   a transistor which controls the voltage value of power output to the multi-phase PWM control DC/DC converter power supply unit; and
   an error amplifier which has a first terminal supplied with the voltage value of power output to the multi-phase PWM control DC/DC converter power supply unit and a second terminal supplied with the reference voltage selected by the switching unit, and supplies a control signal generated from a voltage supplied via the first terminal and a voltage supplied via the second terminal to the transistor, and
   the switching unit includes:
   an acquiring unit configured to acquire a voltage of power output from the multi-phase PWM control DC/DC converter power supply unit;
   a voltage source which outputs power of a preset voltage value;
   a second amplifier which increases the voltage value of power acquired by the acquiring unit by N times; and
   a control unit configured to supply the voltage of power output from the amplifier to the second terminal as the reference voltage when the voltage value of power output from the amplifier is not smaller than the preset voltage value of power output from the voltage source, and to supply input the preset voltage of power output from the voltage source to the second terminal as the reference voltage when the voltage value of power output from the amplifier is smaller than the preset voltage value of power output from the voltage source.

6. The power supply device according to claim 5, further comprising an adjusting unit which increases/decreases the voltage of power acquired by the acquiring unit of the switching unit by a preset amount.

7. The power supply device according to claim 5, wherein the power supplying power supply unit further includes an adjusting unit which increases/decreases the voltage of power to be supplied to the first terminal of the error amplifier by a preset amount.

* * * * *

UNITED STATES PATENT AND TRADEMARK OFFICE
CERTIFICATE OF CORRECTION

PATENT NO. : 7,173,400 B2  
APPLICATION NO. : 10/978334  
DATED : February 6, 2007  
INVENTOR(S) : Morioka It is certified that error appears in the above-identified patent and that said Letters Patent is hereby corrected as shown below:

Claim 5, column 8, line 52, change "supply input the" to --supply the--.

Signed and Sealed this

Tenth Day of April, 2007

JON W. DUDAS  
*Director of the United States Patent and Trademark Office*